(12) United States Patent
Lucek et al.

(10) Patent No.: US 7,377,477 B2
(45) Date of Patent: May 27, 2008

(54) PRODUCT FORMING MOLDS AND METHODS TO MANUFACTURE SAME

(75) Inventors: John William Lucek, Powell, OH (US); Marc Gary Davidson, Dublin, OH (US); Timothy F. Dumm, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 202 days.

(21) Appl. No.: 11/055,887

(22) Filed: Feb. 11, 2005

(65) Prior Publication Data

US 2005/0173834 A1 Aug. 11, 2005

Related U.S. Application Data

(60) Provisional application No. 60/543,850, filed on Feb. 11, 2004.

(51) Int. Cl.
*C03B 11/08* (2006.01)

(52) U.S. Cl. .................... 249/114.1; 249/116; 425/808; 65/26; 65/374.15

(58) Field of Classification Search ............. 249/114.1, 249/115, 116, 139; 425/808; 65/26, 305, 65/374.15; 106/38.27, 38.28, 38.9
See application file for complete search history.

(56) References Cited

U.S. PATENT DOCUMENTS

| | | | | |
|---|---|---|---|---|
| 3,617,363 A | * | 11/1971 | Metzger et al. | 427/383.7 |
| 3,762,882 A | * | 10/1973 | Grutza | 428/615 |
| 4,197,902 A | * | 4/1980 | Von Jan et al. | 164/418 |
| 5,380,349 A | | 1/1995 | Taniguchi et al. | |
| 5,382,274 A | * | 1/1995 | Yamamoto et al. | 65/26 |
| 5,453,293 A | * | 9/1995 | Beane et al. | 427/96.1 |
| 5,482,637 A | * | 1/1996 | Rao et al. | 508/100 |
| 5,711,780 A | | 1/1998 | Taniguchi | |
| 5,855,641 A | | 1/1999 | Taniguchi | |
| 5,928,771 A | * | 7/1999 | DeWald et al. | 428/216 |
| 5,938,810 A | | 8/1999 | De Vries, Jr. et al. | |
| 6,314,763 B1 | | 11/2001 | Sakamoto | |
| 6,314,764 B1 | | 11/2001 | Sakamoto | |
| 6,548,453 B1 | * | 4/2003 | Narasimhan et al. | 508/106 |
| 6,557,378 B2 | | 5/2003 | Takagi et al. | |
| 6,564,584 B2 | | 5/2003 | Hirota et al. | |
| 6,766,999 B2 | | 7/2004 | Hosoe | |
| 2002/0117600 A1 | * | 8/2002 | Hosoe | 249/135 |
| 2002/0118456 A1 | | 8/2002 | Hasman et al. | |
| 2002/0129620 A1 | | 9/2002 | Hirota et al. | |
| 2003/0115907 A1 | | 6/2003 | Patton et al. | |
| 2003/0154744 A1 | | 8/2003 | Hirota et al. | |

FOREIGN PATENT DOCUMENTS

| WO | WO 2004/072357 | 8/2004 |
|---|---|---|
| WO | WO 2005/002742 | 1/2005 |

\* cited by examiner

*Primary Examiner*—Yogendra N. Gupta
*Assistant Examiner*—Dimple Bodawala
(74) *Attorney, Agent, or Firm*—Pepper Hamilton LLP

(57) ABSTRACT

Product forming molds have surfaces conformally coated with a coating composite comprising superabrasive particles. In one embodiment, the mold surface is plated (electrolessly or electrolytically) or coated with a metal having superabrasive particles dispersed therein. In another embodiment, the composite is a SiC composite having superabrasive particles dispersed therein.

20 Claims, 7 Drawing Sheets

PRODUCT FORMING MOLDS AND METHODS TO MANUFACTURE SAME

CROSS REFERENCE TO RELATED APPLICATIONS

This application claims the benefit of and priority to U.S. Provisional Application Ser. No. 60/543,850 filed Feb. 11, 2004; the contents of which are incorporated herein by reference in their entirety.

BACKGROUND

Molded articles such as glass lenses, screen panels for televisions, etc., require refracting surfaces of precise configuration and a high degree of surface smoothness. With respect to other molded articles such as glass bottles, containers, and the like, the requirement for surface smoothness is not as stringent, but there is a common requirement for the molding to be done at high temperatures of about 500° C. or higher. Accordingly, the mold to be used for glass forming has chemical and physical properties such as mechanical strength, heat resistance, and chemical stability against the high temperature mold glass, as well as other characteristics such as surface roughness, surface precision, and release property.

In the manufacture of glass articles, such as bottles, containers, and optical elements, molten glass can be supplied in gobs or charges from a furnace or hearth to a gob chute for conveyance to a split cavity glass forming mold maintained at a temperature of the order of about 500° C. or higher. The mold defines a forming cavity that is disposed with its axis generally vertical, and an access opening in one end of the mold that permits loading of the gob into the cavity. Stainless steel, nickel alloys, steel alloys, and free-machining metals such as aluminum are known as base materials for glass forming molds. In the glass molding process, masses of heat-softened vitreous material, known as gobs, are thrown into the mold (e.g., blank mold and neck ring). For example, in one type of process the mold, upon receipt of the molten glass gob, may be inverted and compressed air blown into it to spread the glass into the shape of the cavity and form the shape of the article. The halves of the mold are then separated, and the formed article is removed while still hot.

In another type of molding operation, such as a plastic molding operation a parison is formed in one mold, which is commonly referred to as the blank mold. This parison may include a neck cavity formed by a neck ring placed adjacent the blank mold to form the neck of the article. After forming the parison by either the above-described air pressure method or by use of the positive pressing force of a plunger inserted into the mold cavity, the parison is transferred to another mold called the blow mold and formed to a final shape by a blowing technique.

In both types of operations, lubricant is either sprayed onto the empty mold cavity by automated mechanical devices or, alternatively, applied by hand swabbing. The lubricant is used to protect the mold from the glass and oxidation, as well as to lubricate the mold/glass interface during molding. Release, lubricating or parting agents have been used in the form of an oil (swabbing compound) containing graphite at intervals of several tens of minutes. The lubrication of the various parts of the mold, including the neck ring, the bottom plate, the mold cavity and the plunger used in the press and blow process, is used to improve gob loading and to improve the release of the formed glass products from the mold and prevent flaws in the product caused by sticking.

There are several significant disadvantages in lubricating molds, either by hand or automatically. Hand swabbing, aside from being hazardous, requires application of lubricant at a time when the cycle of the machine mechanism permits. Mechanized spray units complicate the cycle of the machine and require that the mold parts to be lubricated be made accessible for insertion of a spray nozzle and time allowed for spraying and removal of the nozzle before beginning the forming cycle again. In the application of a release agent or lubricant to a mold surface by hand or an automated sprayer station, one or more cycles of molding may be missed because of the time required for the swabbing or spraying operation. Sprayer stations add to the cost and maintenance of the molding process. These combine to decrease productivity, increase costs, and may result in non-uniform, excessive or incomplete lubrication of the mold parts. Since the mold may be heated at a high temperature of about 500° C. or more, oil soot generates to deteriorate the working environment. Moreover, any graphite applied in excess amounts can adhere to the surfaces of the glass causing the products to be fouled.

Several patents describe prior attempts to address these problems. For example, Sano, et al. in U.S. Pat. No. 5,595,639 teaches coating the inner surface of the glass-forming mold a nickel or nickel-based alloy composition comprising chiefly nickel and graphite granules. Hagerty, et al. in U.S. Pat. No. 4,747,864 discloses glass-forming molds coated with an optically smooth titanium nitride surface. Blair in U.S. Pat. No. 4,168,961 discloses molds having molding surfaces of a silicon carbide/glassy carbon mixture. Copeland in U.S. Pat. No. 3,244,497 discloses glass forming mold parts having surfaces coating with refractory nitrides, carbides, oxides, borides and boride complexes. Blair et al. in U.S. Pat. No. 4,139,677 proposes a molding surface of silicon carbide or silicon nitride. Oiwa et al. in U.S. Patent Publication No. 2003/0005725 teaches coating the mold with a chromium-plated coating film and subsequently a coating containing a silicon compound. Christini et al. in U.S. Pat. No. 3,936,577 and RE 33,767 disclose methods for concomitant particulate diamond deposition in a metal by electroless plating on substrates. Spencer discloses in U.S. Pat. No. 4,906,532 particulate diamond composite coatings for textile tools by electroless deposition where the diamond has at least two nominal sizes. Feldstein discloses in U.S. Pat. No. 6,309,583 a method of making composite coatings with enhanced thermal properties by electroless deposition that include diamonds. All of the references listed in this paragraph are incorporated into the present disclosure in their entirety by reference.

There is still a need for mold components having improved wear and release properties.

SUMMARY

Versions of articles such as forming molds, press molds, or injection molds, or other material handling tool surfaces that are in contact with a sample material that has been heated to a temperature that the material is in plastic or molten state are provided with a surface that includes particulate superabrasive materials in a matrix. The article surface contacts the sample material in the molten state or viscous state, and is used for handling the material before, during, and or after molding. The superabrasive material in the matrix may be part of a conformal coating on the surface of the article. Particulate superabrasive materials are among the hardest materials known and when present on the surface or applied as a coating on the article base, may provide improved resistance to wear and corrosion, as well as a good surface finish to the molded products or objects. Molds that have a surface with a superabrasive particulate material are especially useful for chemically compatible molding, stamping, or forming into a shape a variety of materials in a plastic or molten state such as but not limited to glasses, glass ceramics, or thermoplastic polymeric materials.

One embodiment of an article is a mold having a particulate superabrasive material as a surface or part of a coating on the surface of the mold. Preferably the coating is a conformal coating on the surface of the mold. The mold can be used to make glass containing objects and has improved wear and corrosion properties. Methods to manufacture these glass forming molds are described. The mold base can have a layer or a conformal coating of a superabrasive material in a matrix on the base, the base may be made of a metal, an oxidation resistant steel, ceramic, and/or other corrosion resistant material used for molding objects.

Another version of an article is a mold that is used to mold a molten material like a gob of glass or an injected thermoplastic in a forming process. The mold has at least one molding surface that contains a particulate superabrasive in a matrix. The matrix can include one or more synthetic or natural diamond, cubic boron nitride (cBN), or mixtures of these incorporated into the surface of the mold. Optionally these superabrasive particles may be mixed or combined with other abrasive materials such as but not limited to boron carbide, silicon carbide, aluminum oxide, zirconium oxide, silicon dioxide, and other abrasives. Optionally lubricating materials like $MoS_2$, graphite, or hexagonal cubic boron nitride or others may be added to the coating. The superabrasive composite matrix, optionally with other abrasives and or lubricants, can be coated onto the wear surface of the mold by a plating process and preferably forms a conformal coating of the particulate superabrasive in the matrix on the mold surface. Alternatively, the superabrasive surface can be a composite coated onto the mold surface of the glass forming mold by the pyrolysis of a thermoset resin and particulate superabrasive mixture, or the superabrasive surface may be a part of the structural base of the mold substrate.

A method for making articles that have an adherent surface with good release properties and wear resistance, for example molds, forms, stamps, or molten material handling surfaces includes the acts of coating a metal, or an oxidation resistant steel, or steel alloy, or a cast iron, a nickel-chromium alloy, aluminum, a ceramic, or other base material with a composite comprising one or more of superabrasive particulate materials in a matrix. The superabrasive particles include synthetic or natural diamond, cBN, or mixtures of these. Optionally other abrasives and/or lubricants, may be coated onto the wear surface of the mold or mold process article. The article surfaces can be used to contact a sample material that has been heated to a plastic or molten state temperature, for example a thermoplastic, a glass ceramic, a glass gob, a glass blank, or a hot molded glass object. The coating can be a conformal coating of the particulate superabrasive material in the matrix where the coating is bonded to the surface of the article base.

One version of a method used to mold an object may include the acts of softening a moldable material by heating or press-molding the heat-softened molding material with a forming mold that has surface that can include superabrasive particles in a matrix. The forming mold can include an upper mold and a lower mold, and each mold can have shaped surfaces that can include superabrasive particles in a matrix bonded to the mold base. The mold may be an injection mold or other mold. These wear resistant mold or process article surfaces contact the molten material and are used to make shaped surfaces of the molded object. The press molding process transfers the shapes of the superabrasive containing molding surfaces to the thermoplastic, glass ceramic, glass, or other material being molded. The molded object may be cooled in the mold to a temperature equal to or lower than the glass transition temperature (Tg) of the material and the shaped object removed from the forming mold.

A version of a method for molding a finished a glass article can include the step of pressing a heat-softened material against a molding surface that has a coating of a particulate superabrasive material in a matrix bonded to the mold base. The force conforms the heat-softened material to the super abrasive containing molding surface. The molding surface coating may include one or more superabrasive material such as natural or synthetic diamond, cBN, or mixtures of these. The method can include the acts of cooling the molded material and molding surface to a temperature below the $T_g$ of the material and removing the finished molded, cast, or pressed object from the mold.

One version of a method used to mold glass objects may include the acts of softening a glass molding material by heating, or press-molding the heat-softened glass molding material with a forming mold that has surface that may include superabrasive particles in a matrix. The forming mold can include an upper mold and a lower mold, and each mold can have shaped surfaces that can include superabrasive particles in a matrix bonded to the mold base. These wear resistant surfaces contact the molten material and are used to make shaped surfaces of the glass object. The press molding process transfers the shapes of the superabrasive containing molding surfaces to the glass material being molded. The molded glass object may be cooled in the mold to a temperature equal to or lower than the glass transition temperature (Tg) of the glass and the shaped object removed from the forming mold.

A version of a method for molding a finished glass article can include the step of pressing a heat-softened glass material against a molding surface that has a coating of a particulate superabrasive material in a matrix bonded to the mold base. The force conforms the heat-softened glass to the superabrasive-containing molding surface. The molding surface coating may include one or more superabrasive materials such as natural or synthetic diamond, cBN, or mixtures of these. The method can include the acts of cooling the molded glass and molding surface to a temperature below the $T_g$ of the glass and removing the finished glass object or product from the mold.

A version of a method for making a molded object includes the acts of pressing a material at a temperature in the working range of the material with a mold having a surface in contact with the material. The mold surface includes a particulate superabrasive material bonded to the mold and is used to shape or mold the material. The superabrasive material of the mold surface can be dispersed in a matrix that is formed by a plating process that bonds the matrix to the base of the mold. Preferably, the superabrasive material in the matrix on the surface of the molding article forms a conformal coating.

In addition to the mold surfaces, other manufacturing tool surfaces and articles that contact a molten or viscous material or manipulate a heated or otherwise molded object may includes surfaces that contain particulate superabrasive materials in a matrix. These tools are useful in molding operations in general, such as in glass molding operations when oxidation resistance, low adhesion, thermal conductance, and wear resistance are important. These articles may include but are not limited to parts in contact with the molten material such as gob deflectors and conveyer guides, gob feeder surfaces and gob orifices, stirrers, gob plungers, and gob cutting knives. These articles, for example the knives, may also have hollow conduits in their base for a cooling heat exchange fluid such as water or air and preferably have a base that has sufficient thermal conductance for its intended use. Other mold operation structures that can have surfaces that contain a particulate superabrasive materials in a matrix or that have a coating of a superabrasive material in a matrix bonded to the structure base include but are not limited to mold blanks, neck rings, plungers, blow mold plates, blow mold, and jaws for removing a molded object or product from the mold.

One embodiment of an article that can be used for molding objects includes a mold that has a shaped surface. One or more portions of the shaped mold surface may be composed of a particulate superabrasive material in a matrix. The matrix can be the base or the matrix can be a coating, and preferably a conformal coating, that is bonded to one or more portions of the base surface. The surface of the mold contacts a softened material, a material heated in its working temperature range, during a molding process and transfers the shape of the mold to the softened material. The particulate superabrasive material in the matrix can be a conformal layer adherently bonded on a mold base that is formed by an electroless plating process. The conformal coating may be heat treated to increase the hardness of the matrix. The mold may include one or more pieces that assemble into the mold such as but not limited to a bottom plate and one or more side plates. Alternatively the mold can be a mold blank with a valve and a neck ring. Where the superabrasive material in the matrix is coated onto the surface of a mold base, the base material can be a metal, an oxidation resistant stainless steel, cast iron, aluminum, or a ceramic. The matrix can be a metal or a ceramic and is chosen to be chemically and physically compatible with the molding process conditions including the molding material, molding atmosphere, and/or molding temperature. Preferably the matrix is a metal and even more preferably includes nickel, for example electroless plated nickel or one or more of alloys of nickel especially those containing boron, phosphorous, or combinations of these. The matrix with the superabrasive particles on the shaped surfaces of the mold base may be thermally annealed to increase the hardness of the matrix and/or bonding of the matrix with the mold base.

One embodiment of a method to make a molded object includes the acts of pressing a material at a temperature in the working temperature range of the material with a mold having a shaped surface in contact with the material. The shaped surface of the mold includes a particulate superabrasive in a matrix that contacts the material to be molded. The superabrasive material in the matrix may include but is not limited to natural or synthetic diamond, cubic boron nitride, or a mixture of these. The matrix encapsulating the superabrasive particles can include a ceramic or metal material. Preferably the matrix includes a metal that forms a conformal layer on the base and includes nickel, for example electroless plated nickel or one or more of alloys of nickel especially those containing boron, phosphorous, or combinations of these.

Another version of an article that is used for molding a molten material includes one or more surfaces that contact or manipulate molten glass in a glass molding process, the surface in contact with molten glass includes an adherent bonded conformal coating of a particulate superabrasive in a metal matrix. The metal matrix and superabrasive are homogeneously mixed in a coating on a portion of the article surface that is used to contact with the molten glass. Examples of such articles include but are not limited to a plunger, a gob knife, a mold, a gob orifice, or a mold neck ring. The particulate superabrasive can include separately natural or synthetic diamond, cubic boron nitride, a mixture of these, or a mixture of these or other abrasive materials, or lubricant materials.

These and other features, aspects, and advantages of the present invention will become better understood with regard to the following description, appended claims, and accompanying drawings.

DETAILED DESCRIPTION

Figure 1:
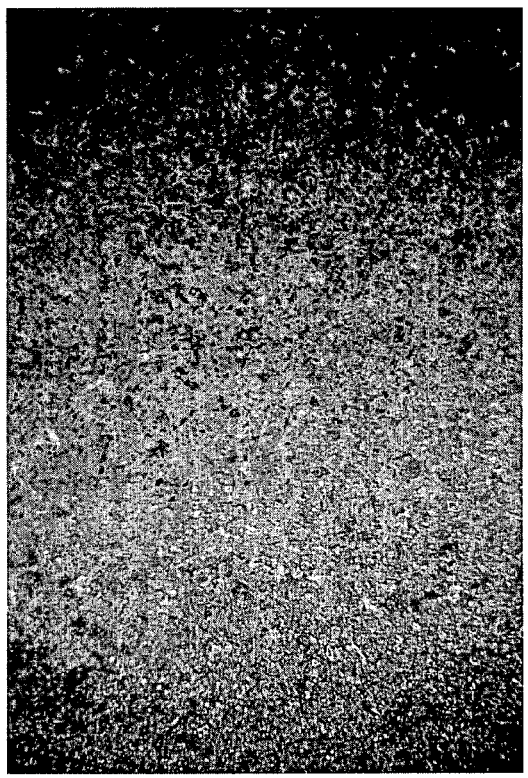
FIG. 1 is a optical micrograph of the inner surface of a mold, where the surface includes a particulate superabrasive material dispersed in a matrix that adheres to the mold base.

Before the present compositions and methods are described, it is to be understood that this invention is not limited to the particular compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "superabrasive particle" is a reference to one or more superabrasive particles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

"Optional" or "optionally" means that the subsequently described event or circumstance may or may not occur, and that the description includes instances where the event occurs and instances where it does not.

Applicants have found that the use of particulate superabrasive material in the surface of a mold material, either as a coating deposited directly onto the contact surfaces of forming mold parts or as a component of the mold base, may provide surprising wear and corrosion resistance as well as improved surface quality for the molded glass, plastic, glass ceramics, or other moldable materials. Similar coatings or compositions can be deposited on other articles used in molding processes and can include plungers, jaws, gob cutting knives, or other parts that contact the heated material in the molding process. The applicants have also found that unanticipated benefits of the coating may also accrue for plastic molding components. These components or articles can include plastic forming molds and components: extruder pistons, die plates, barrels, screws, flights, forcing cones, transfer molds, gates, sprue cutters, mold surfaces.

The surface of the mold or other mold process articles includes a dispersion of superabrasive particles in a matrix. The matrix may form the base of the mold or other mold process article, or the matrix may be bonded chemically and or physically to a base material of the mold or other mold process article. The matrix can include a ceramic, a metal, or a metal alloy. In one embodiment, the superabrasive particles are dispersed in a continuous metal matrix that forms a coating layer bonded to the base material of a mold or other mold process article. The metal matrix can be plated onto the base or other article used in the molding process with the superabrasive present in the plating bath. Useful metal matrices include a metal or metal alloy that can include, without limitation, nickel, chromium, cobalt, copper, iron, zinc, tin, aluminum and tungsten, either alone or in various combinations. The metal matrix is chemically compatible with the heated glass or polymeric material to be molded. In an embodiment, the matrix may include nickel or alloys of nickel where the matrix and superabrasive particles form a conformal coating bonded to the base.

The surface of the mold or other glass or plastic handling article may have a plurality of superabrasive particles that are bonded to the matrix and the surface of the mold. The interstices between the superabrasive particles can be filled with the matrix material and form a continuous matrix. The matrix can have a working surface that can be used to contact a molten material to be molded.

The matrix that chemically and or mechanically bonds the superabrasive particles to the mold or mold surface may have high wear resistance and high oxidation resistance. It may be chemically compatible with the molten material and environmental conditions during the molding process, and it may eliminate or minimize the amount of contamination residue on the molded object. For example, for molding of fluorine containing thermoplastic materials, the matrix with the dispersed superabrasive particles may be resistant to corrosion by traces of HF that may form. The metal matrix has coefficients of thermal expansion, elastic, and thermal properties similar to that of the mold substrate, reducing the tendency to spall off during thermal cycling. Furthermore, the surface formed may be used with little or no surface corrections to the mold to meet the surface tolerance limits established for the final formed element.

The overall composite coating including matrix and superabrasive articles may have a thickness controlled by the length of time that the base material is within the plating tank. The coating may have thickness of about 5 microns to about 250 microns, the coating may have a thickness of about 20 microns to about 120 microns, other coatings with different thicknesses are also possible. The thickness of the coating for application can be determined by wear rate, cost to coat the part, and cost to replace a part with one having a new coating. Throughout the thickness of the composite coating, the superabrasive particles are fully encapsulated by the metal matrix, and are held in place by the metal phase (see FIG. 7). It is observed at the very top layer of the composite coating, that superabrasive particles will protrude, even above the metal matrix. This is especially evident when looking at surfaces that have experienced some degree of wear. Without wishing to be bound by theory, it appears that the metal matrix wears away at a rate that is faster than the superabrasive particles and that the protruding particles actually bear most of the direct contact with molten or viscous material, or with the abradant surface. (See FIG. 8). As wear of the coating progresses at the surface, superabrasive particles are eventually pulled out of the matrix, and new particles are exposed from underlying layers.

Although the superabrasive particles are mechanically retained by the metal matrix, the metal matrix is quite firmly attached to the base part. This is especially true if the base part is made of a steel, aluminum, nickel, cobalt, brass, bronze, copper or other metallic materials. In certain embodiments, the tensile adhesion bond strength of electroless nickel to steel has been measured to be in the range of about 30,000 to about 60,000 psi on steel, and about 20,000 to about 45,000 psi on aluminum. These coatings may be used for the surface molds or articles used in molding operations. By contrast, typical thermal spray coatings have tensile adhesive bond strengths of 5,000 to 10,000 psi. The addition of superabrasive particles to the electroless nickel may not reduce the adhesion to the base part as a thin continuous layer of nickel is deposited onto the base before the co-deposition of the particles begins. In one embodiment the coating of particulate superabrasive material in the matrix that is a conformal layer adherent on a mold base or mold process article has an adhesion bond strength greater than about 10,000 psi. In one embodiment the coating of particulate superabrasive material in a matrix that is a conformal layer adherent on a mold base or molding process article has an adhesion bond strength of from about 30,000 to about 60,000 psi; in another embodiment the coating has an adhesion bond strength of from about 20,000 to about 45,000 psi. These coatings may be used for surface of molds or articles used molding operations that include providing a material heated above its working point to a mold.

Glasses, ceramic glasses, waxes, and thermoplastics are examples of material that may be molded or "worked" over a range of viscosity limits. The working point for a material is the temperature at which the heated material can be formed or manipulated. Materials heated above the working point that can be handled, molded, cast, or stamped with the coated articles may have a viscosity of from about 100 poise (essentially a liquid) to about 100,000,000 poise (where the material will creep at measurable rates under load). In one embodiment, molding may be performed on heated glasses having a viscosity of about 5,000 to about 10,000 poise, in another embodiment, molding may be performed on glasses having a viscosity of from about 5,000 to about 20,000 poise. Thermoplastics are injection molded at higher pressures than glass forming operations. In one embodiment thermoplastics may be handled or molded with articles having an adherent superabrasive material surface with the thermoplastics having a viscosity of from about 75,000 to about 100,000 poise. In one embodiment thermoplastics may be handled or molded with articles having adherent superabrasive material surface, the thermoplastics having a viscosity of from about 50,000 to about 200,000 poise.

The surface finish of the mold or other material handling surfaces used in the molding process that have a surface that contains superabrasive particles in a matrix may provide a molded product with sufficient smoothness for its intended use. For thin walled molded objects, the roughness may be less than half the thickness of the molded object wall. Mold surfaces with particulate superabrasive particles in a matrix may be used to make optically smooth surfaces by molding. The surface roughness of composite coatings is generally dependent upon various factors such as particle size; concentration of particles; thickness of the coating and roughness of the substrate which may be adjusted in preparing the mold surfaces. It is expected that as the superabrasive particle size increases in the matrix, so does the surface roughness. Greater concentrations of the specific superabrasive particles in the matrix further tend to increase the surface roughness for the resulting composite coating. The particle sizes used in the superabrasive surface can be sized to meet the molding requirements.

In molding operations, it has been found that elements or articles molded using the mold having the particulate super abrasive material have high surface quality and high surface accuracy. High surface quality is meant surface quality as utilized in certain optical parts such as lenses, with surfaces being devoid of scratches, digs, pits and the like.

The wear resistance properties of coatings comprising superabrasive particles in a matrix on the surface of a molding article are generally dependent on the choice of the abrasive, the volume content, the size of the particles, the matrix composition, overall thickness and heat treatment. One skilled in the art could determine the appropriate coating without undue experimentation to provide mold surfaces with a useful balance between wear and surface roughness of the finished molded object or product for any chosen application.

The average size of the abrasive materials (superabrasives as well as optional materials, sometimes referred to as "grit") selected for the surface is determined by a variety of factors, including the type of superabrasives/abrasives used, the material to be molded, the molding parts, and the roughness of the finished molded object. In one embodiment, the particle size is about 0.2 to about 50 microns. In another embodiment, the particle size is about 0.5 to about 10 microns.

Where the particulate superabrasive dispersed in a matrix is deposited on the base of a mold or base of a material handling article, for example using an electroless plating process, the base material can be prepared by mechanical cleaning, degreasing, anode-alkaline cleaning, and/or pickling in an acid bath in accordance with known practice in the metal-plating art. The substrate can be masked if necessary to allow deposition of the particulate superabrasive and metal or alloy only on selected surfaces. Optionally, coating bonding or adhesion to a base material can often be improved by depositing a strike layer electrochemically on the substrate surface prior to applying the coating of the particulate superabrasive in the metal matrix on the base.

The manufacturing of plastic forming molds used in the glass or plastic industries may include the step of machining the figure of a finished product or object such as a container surface, a sphere surface, or an aspherical surface (for optical lenses), etc. into the mold body, forming a blank mold or a finish mold. In some embodiments, the mold has a shape for an object that holds a fluid or can be used to protect air sensitive electronic elements, a filament, or other structures. The shaped mold can then be coated with a particulate superabrasive dispersed in a matrix. Other mold processing equipment articles that can be made with surfaces that include superabrasive particles in a matrix include mold components such as a neck ring, bottom plate, baffle, press mold and/or other tool with one or more surfaces that are used for the production of molded objects. Such objects may include, for example, molded glass objects and products such as containers, lenses, panels, and the like. Examples of glass forming operations that use mold processing equipment articles include forming a gob, press molding, blow molding, press and blow processes or blow and blow molding process.

A gob refers to a lump or mass of a material that is in a molten or plastic state that is soft. In molding processes the gob can be any material that has been heated to a temperature where its viscosity is low enough that it can be formed or manipulated into a final shape object and then cooled to retain the object's shape. Usually, the working point temperature or working range of a material provides a measure of the viscosity of the material where it can be processed by molding, or casting, or stamping, or extruding, or injecting.

Molds that have a particulate superabrasive material in a matrix containing surface may also be used in hot isostatic pressing applications where heat and pressure are simultaneously applied to a part causing it to shrink and densify in a substantially uniform manner. It can be used directly to consolidate a powder or supplementary to further densify a cold pressed, sintered, or cast part. The pressure medium is typically a gas (such as argon or nitrogen), but it can be a liquid or molten metal. The base material and matrix in which the superabrasive particles are bonded are chosen to withstand the pressure and temperature required to densify a powder directly in the isostatic process.

Materials that can be used as a base for molds and mold processing articles such the mold, neck ring, plunger, blow molds, takeout jaws, gob knives or other structures that contact the heated moldable material may include separately or in with other materials, fused silica, ceramics like SiC, metals, cast iron, steel alloys such as stainless steel, oxidation resistant stainless steels, nickel and its alloys, nickel-chromium alloy, and/or free-machining metals such as aluminum alloys and other materials having chemical compatibility to provide oxidation resistance and good release characteristics, mechanical strength, and temperature resistance for their intended mold process.

The molding surface comprising superabrasive materials can be formed as a solid body of the mold base, or as a coating layer comprising superabrasives in a metal matrix deposited on the mold base. In embodiments wherein the surface is deposited as a coating, the coating layer may be of a sufficient thickness so that, even if removal of some of the coating layer occurs during molding and finishing, the remaining portion of the surface is still sufficiently thick and contains sufficient superabrasive particles that the surface characteristics of the molding part, and preferably the glass molding part, can be partially, substantially or exclusively attributed to the surface containing superabrasives.

In one embodiment, the molding surface thickness containing the superabrasive material is at least the average particle size of the superabrasive particles used. In a second embodiment, the molding surface is at least about 10 microns thick. In a third embodiment of the invention, the molding surface is at least about 25 microns thick. In yet a fourth embodiment of the invention, the molding surface has a sufficient thickness to prevent oxidation of the base material and secure the adhesive strength with the base material of the mold. In a fifth embodiment, the thickness is about 0.2 to about 200 microns. The thickness of the surface coating may be measured by means of SEM, fluorescent X-ray apparatus, or other techniques known in the art.

The term superabrasive refers to materials having a Vickers hardness of greater than about 3000 kg/mm$^2$, and optionally more than about 3200 kg/mm$^2$. Examples of superabrasive or sometimes ultra-hard abrasive refer to materials like diamond, polycrystalline diamond (PCD) or cubic boron nitride (cBN or pCBN) materials, which are highly inert and wear resistant. For use in the mold surfaces or in the surfaces of other mold processing articles that contact the viscous heated material to be molded, the superabrasive may be in the form of discrete particles dispersed in a matrix such that the particles are retained by the matrix. The superabrasive materials can be prepared by methods known in the art, and commercially available from a number of sources, including Diamond Innovations, Inc. of Worthington, Ohio.

Optionally, the superabrasive material may be provided with a thin metal coating such as nickel, copper, titanium, or any wear resistant or conductive metal which can be deposited on the superabrasive crystals. Coated cBN materials are commercially available from a variety of sources such as Diamond Innovations, Inc. under the trade name Borazon®, from DeBeers under the trade name ABN, and Showa Denko Carbon, Inc. under the trade name SBNDN.

Optionally, other materials may be added to the superabrasive materials in an amount of about 5 to about 50 volume % in the coating or in the base material. These may include fine solid particles with a size on the same order as those for the superabrasive particles. These materials may be mixed with diamond, cBN and/or mixtures of diamond and cBN, and can be abrasives that provide cost benefit or for example wetting properties that may be advantageous for a particular material. These abrasives may include but are not limited to the boron-carbon-nitrogen-silicon family of alloys and compounds, SiC, $Si_3N_4$ WC, TiC, CrC, $B_4C$, and the like; $SiO_2$, $Al_2O_3$, $ZrB_2$, Lubricating material may be used in the coating and may include but are not limited to $MoS_2$, graphite, hexagonal boron nitride, polytetrafluoroethylene, and mixtures of these.

There are several techniques that may be used to produce forming molds or molding process equipment with wear resistant surfaces containing superabrasive particles. The superabrasives may be incorporated in a composite to form the molding or process piece as part of a solid piece, with the piece being subsequently machined or ground and polished to form a molding surface. In this case the superabrasive may be dispersed throughout the piece or article. Another technique involves forming a mold part or process handling piece from fused silica, steel alloys, and/or other suitable materials and then coating the surfaces of the mold or process piece, preferably those surfaces in contact with the molten material or heated molded object, with a coating comprising the superabrasives of the invention in a matrix formed by an electrolytic or electroless coating method. The mold part or process piece surface can be pre-coated with a coating layer such as chromium nickel alloy, zirconium oxide, a strike layer, or other layer, prior being coated with particulate superabrasives in a matrix by an electrolytic or electroless process.

Figure 3A:
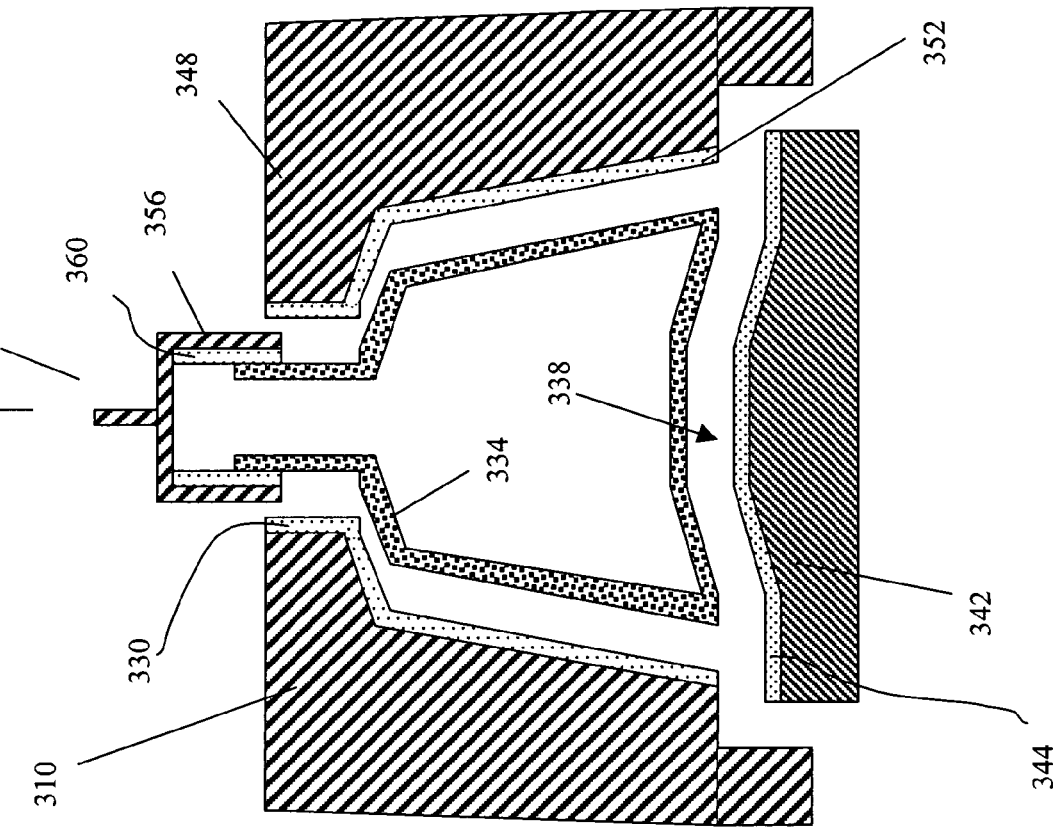
FIG. 3A-B illustrates a cavity in which a substance can be shaped, the cavity or mold that has shaped surfaces with a coating of a particulate superabrasive material in a matrix that can be used for molding a material heated above its working temperature and below its melting temperature to form molded objects.

FIG. 3 illustrates various articles that may be used in a molding process. Portions of the surfaces of these articles contain superabrasive materials in a matrix that is chemically and or mechanically bonded to the base material. The articles may include a mold, a stamp, neck ring and/or other vessel that is used to shape a molten material into a desired shape. The article may include a valve, for example the valve in a press mold blank. The article may be a rod shaped as a plunger and used to press a gob of glass or other material in its working temperature range into a shape in a mold blank. One or more articles having the superabrasive surface may be assembled to form a mold. For example, a blow mold as shown in FIG. 3A may include a blow mold bottom plate 342 with surface features 338 and a coating of a particulate superabrasive material in a matrix 344 that contacts a molded material 334. The mold shown in FIG. 3A includes shaped side molds 310 and 348 each having a coating of particulate superabrasive material in a matrix 330 and 352. The superabrasive particles in matrix 330, 344, and 352 provide a surface that contact a molten material or blank to form a molded object 334. As shown in FIG. 3A, each portion of the blow mold assembly may have a shape that forms a part of the final molded object 334. All or a portion of the mold can have a surface that is a superabrasive particulate material in a matrix or portions of the mold surface that do not contact the molten material can be uncoated. The shaped surface of the mold can have one or more surface features such as, but not limited to, holes, vias, protrusions, or channels that the molten material is pressed into to form details, patterns, or readable characters on the final product. FIG. 3A the neck portion 318 of the molded object 334 is shown in contact with a neck ring 314 having a coating of a superabrasive particulate material in a matrix 326 chemically and or mechanically bonded to the mold ring base 314. The mold surfaces may have one or more holes, vias, protrusions or channels that make up the surface of the mold can have a surface that includes a particulate superabrasive in a matrix. A raised structure 338 that is coated 344 illustrates this feature. The mold shown can be shaped to form an object 334 capable of containing a fluid or enclosing an electronic structures such as but not limited to filaments and electron guns. Molds may be shaped to form optical elements, picture tubes, housings, insulators and other objects.

Figure 3B:
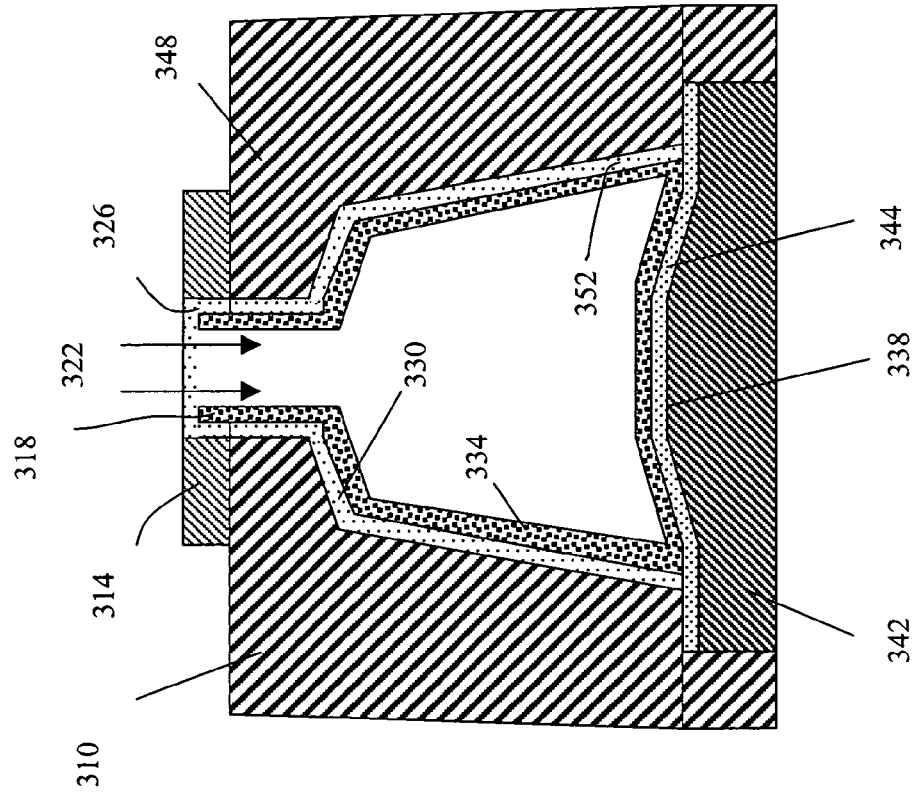

FIG. 3B illustrates removal of the molded object 334 from the mold. The wear resistant coatings 330, 344, and 352 release the molded object and minimize the incorporation of the coating material into the finished object. The molded object 334 can be removed from disassembled mold, shown in FIG. 3B as separated pieces relative to FIG. 3A, by an article 364 that contacts the heated molded object by a surface of superabrasive material in a matrix bonded to article base material 356. The article 364 can be a pair of jaws or tongs, or another suitable article.

Figure 4:
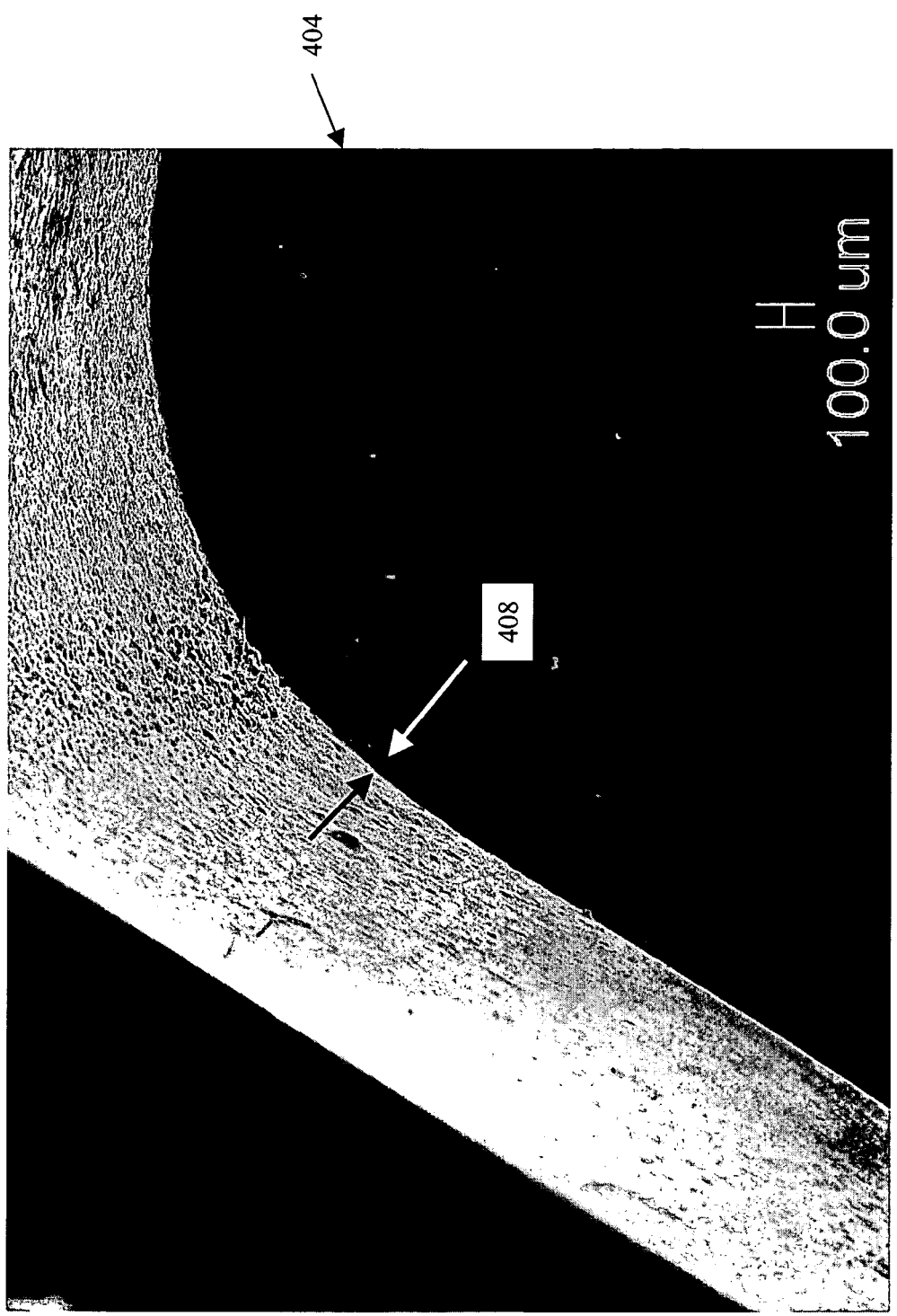
FIG. 4 is a micrograph of a blow tip with an adherent coating of a particulate superabrasive material in a matrix.
Figure 5:
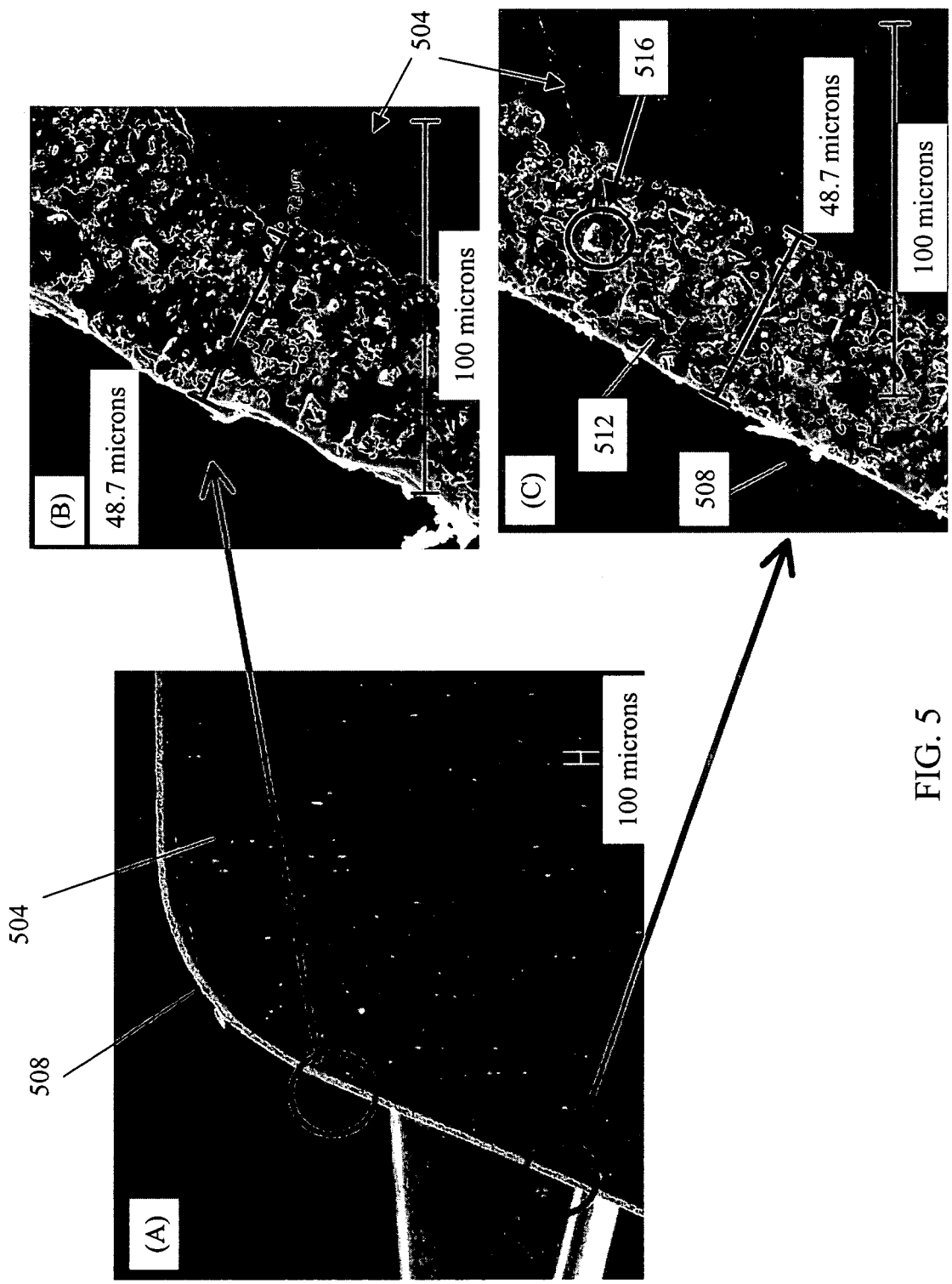
FIG. 5A-C illustrate portions of a conformal particulate superabrasive coating on the base of a blow tip.
Figure 6:
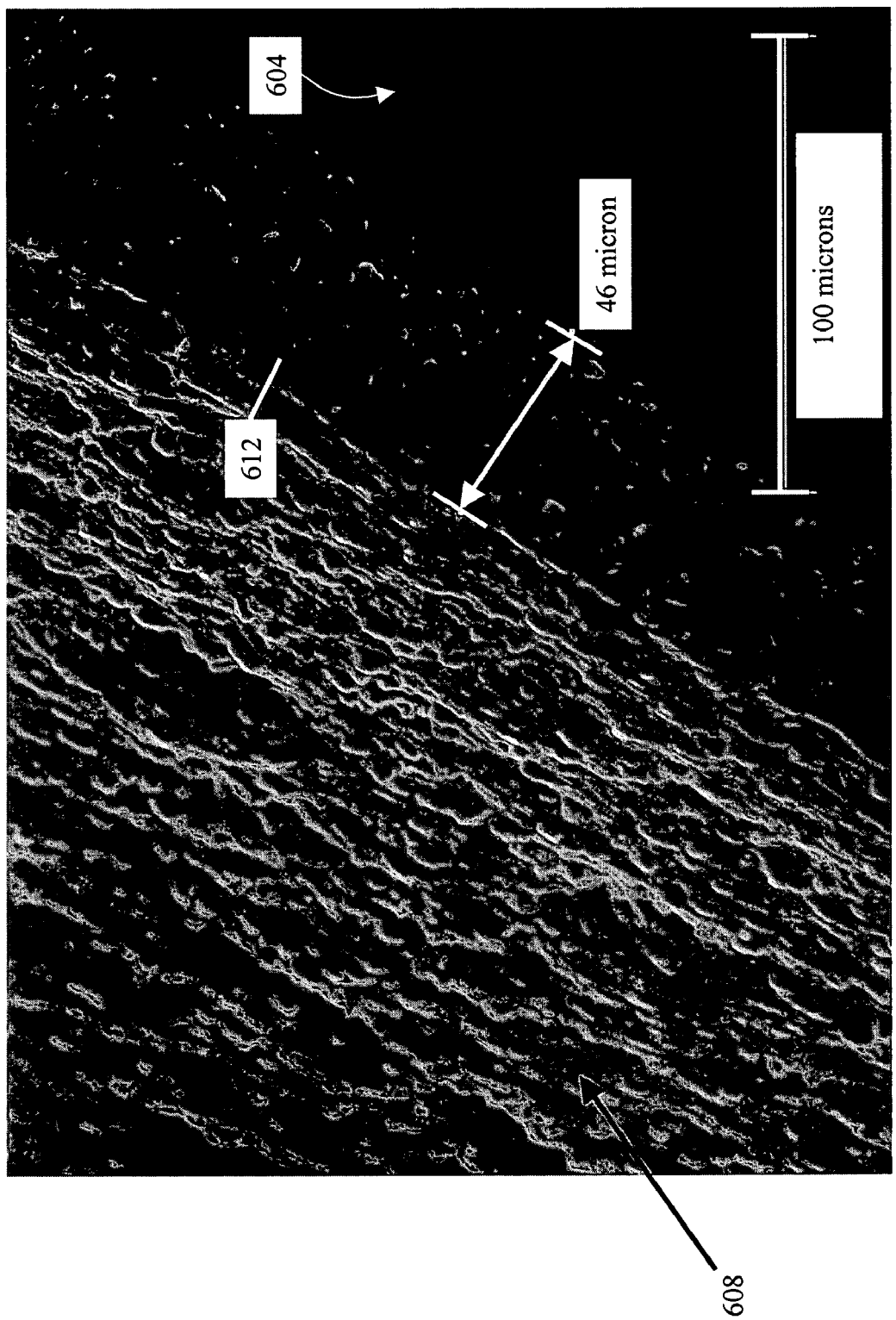
FIG. 6 is a micrograph of a portion of a blow tip illustrating the surface of an adherent particulate superabrasive in a matrix.

An illustrative example of a coating on an article used in a molding process is shown in FIG. 4. FIG. 4 is a micrograph of a blow tip showing coating 408 and base 404. FIG. 5A shows aspect of this article and coating in greater detail. The coating 508 is a substantially conformal coating over the contact zone as everywhere else on the tip. The base 504 can be a metal like Monel or other nickel alloy with a conformal coating 508 of a superabrasive in a matrix 512. FIG. 5B illustrates a cross section of the tip. An example of the superabrasive particle 516 in the matrix 512 of the coating 508 is shown in FIG. 5C. FIG. 6 is a micrograph further illustrating a portion of a blow tip. FIG. 6 shows the surface of an adherent coating 608 of superabrasive particles in a matrix 612 on the base 604.

Figure 7:
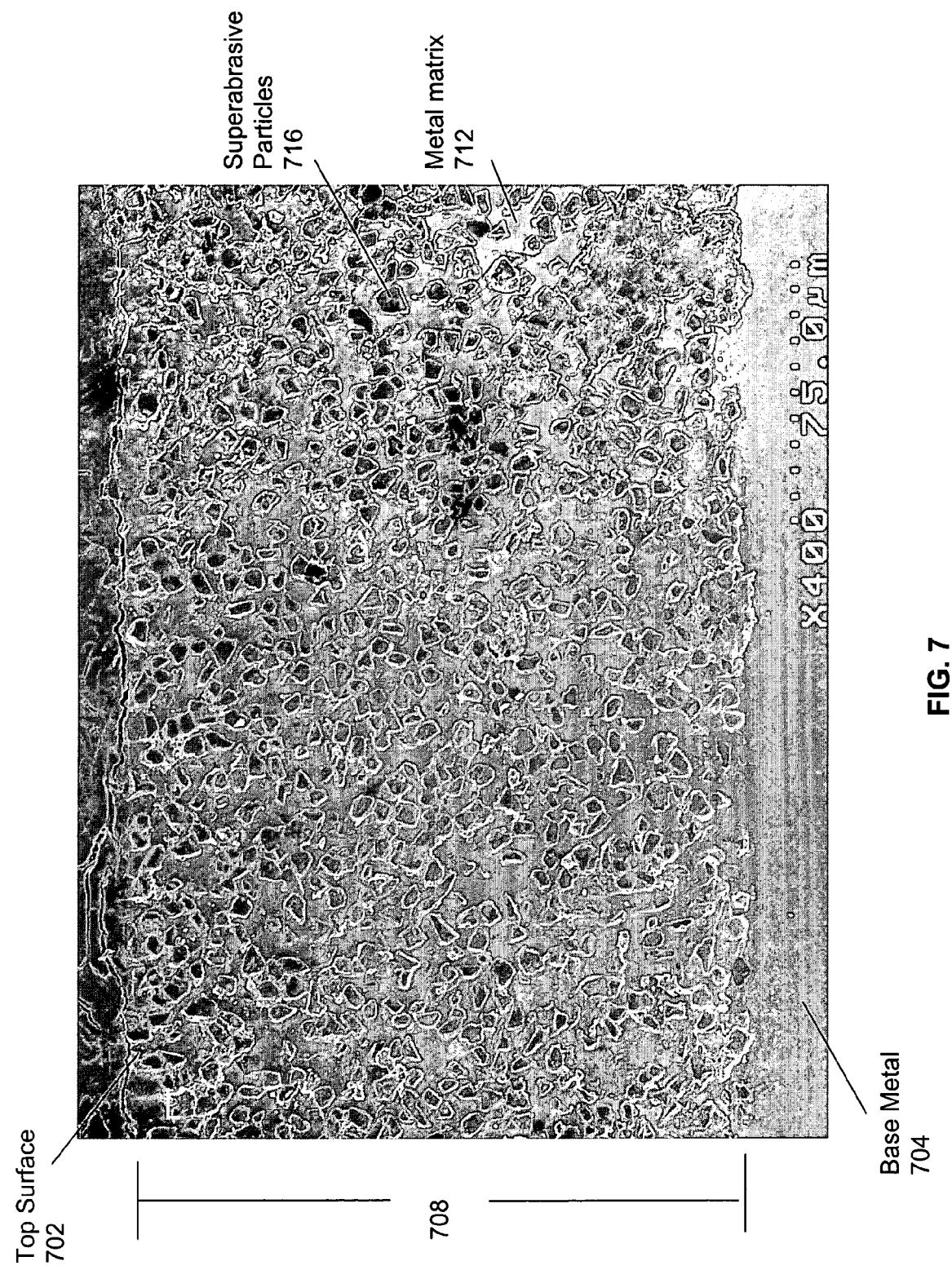
FIG. 7 is a micrograph of a portion of a composite particulate superabrasive in an adherent matrix coating a substrate that may be used to mold or handle molten materials.
Figure 8:
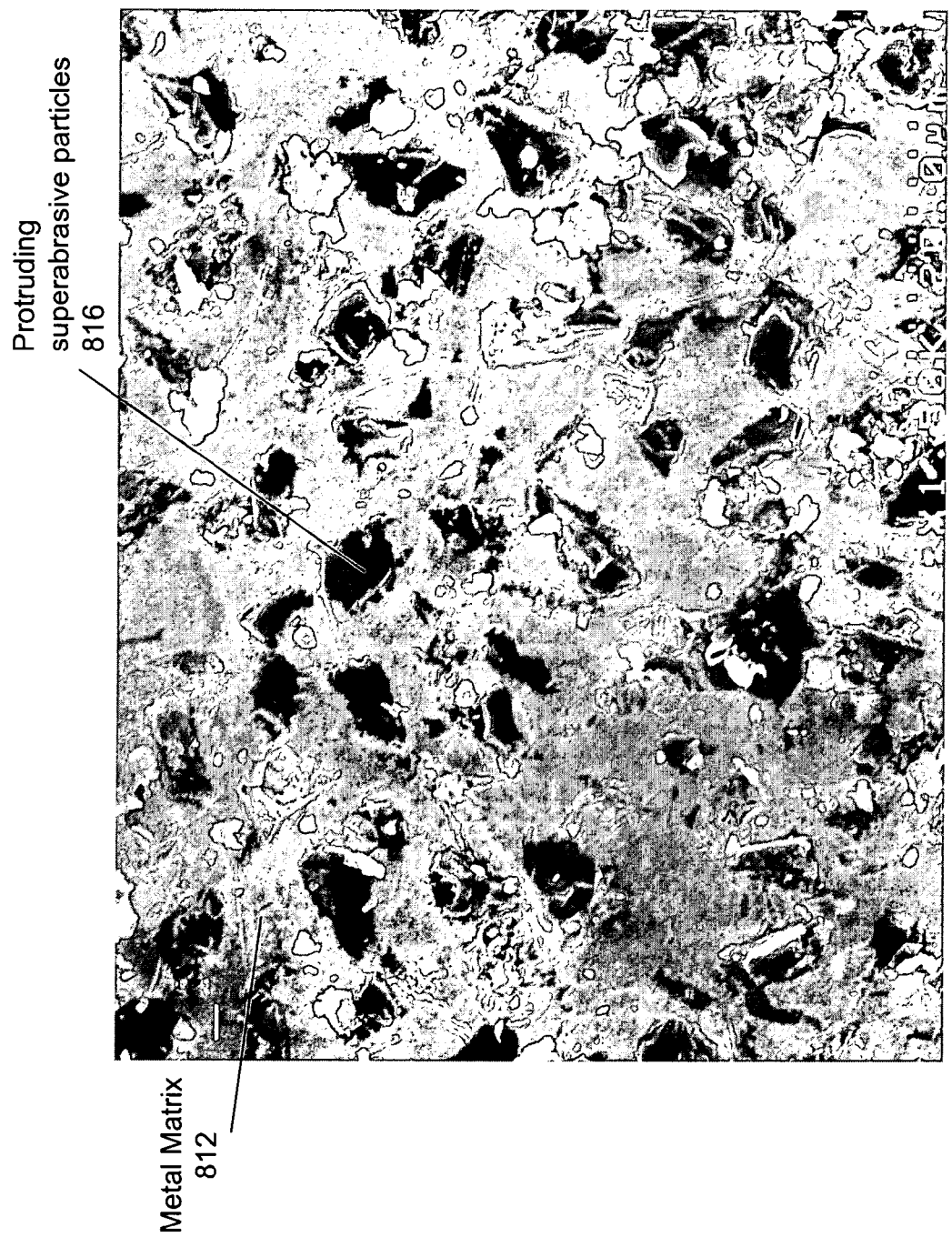
FIG. 8 is a micrograph of a top layer of composite superabrasive material coating after abrasive wear illustrating abrasive particles and matrix.

FIG. 7 is a micrograph of a portion of a composite diamond coating 708 illustrating the top surface 702, base 704, matrix 712, and superabrasive particles 716 dispersed throughout the matrix 712. FIG. 8 is a micrograph of a top layer of composite diamond coating after abrasive wear illustrating abrasive particles 816 and matrix 812.

Mold sections, plungers, gob knives, and other process equipment with a superabrasive particulate material in a matrix on a surface that contacts the molten material may have internal conduits for a heat exchange fluid, not shown in FIG. 3A. For example, a forming mold with a superabrasive material on one or more of its surfaces can be cooled by supplying a flow of an exchange fluid such as water or compressed air from a source to the interior cavities or conduits in the mold or process equipment. The fluid flow can be controlled to attain the required flow and resultant heat exchange and, thereby, the desired mold temperature.

A process for conventional electroplating of abrasives can be used to deposit at least a coating of the superabrasive composites comprising diamond, cBN, or a mixture of these onto surfaces of the glass forming mold that contact the molten glass. The superabrasives may be affixed to the surfaces by at least one metal coating using metal electrodeposition techniques. The metal material for the electrode or the opposite electrode to be composite electroplated may be selected from shaped materials such as iron, iron alloys, aluminum, aluminum alloys, titanium, titanium alloys, copper, copper alloys, chromium, chromium alloys, tin, tin alloys, cobalt, cobalt alloys, zinc, zinc alloys, and/or any of the transition metals and their alloys. In one embodiment, the metal ions contained in the composite electroplating liquid are selected from ions of nickel, chromium, cobalt, copper, iron, zinc, tin and tungsten. The metal ions form a metal matrix consisting of a single metal or an alloy. The metal matrix may have elastic and thermal properties similar to that of the mold substrate, reducing the tendency to spall off during thermal cycling. Furthermore, the surface formed may be used with little or no surface corrections to the mold to meet the surface tolerance limits established for the final glass object or product.

The superabrasive particles of the present invention, i.e., diamond or cBN, and optionally, conventional abrasive materials, may be introduced into the plating bath for deposition onto the plated metal. The amount of superabrasive particles in the plating bath mixture can range from about 1% to about 95% by volume.

The amount of superabrasive particulate material in the matrix coating as a volume percent of superabrasive material to matrix depends upon the coating process but can be about 5% to about 85%. In some embodiments the amount of superabrasive particulate material in the matrix coating as a volume percent of superabrasive material to matrix may be about 15% to about 40%.

In a plating process, electroless or electrolytic, that incorporates the superabrasive particles into the metal film the metal is deposited onto the glass forming mold or mold processing article until a desired thickness of the coating on the surface of the mold or article is achieved. The metal coating(s) can have a combined thickness ranging from about 5 times to about 100 times of the average superabrasive particles. In one embodiment, about 10 times to about 30 times the average diameter of one abrasive particle in the superabrasives composites. In a third embodiment, of more than about 5 times the thickness of one abrasive article.

An electroless metal plating process can be used to place the superabrasive coating onto the glass forming mold. This process allows for the conformal plating of the superbrasives coating of the present invention onto electrically non conductive molds, preferably glass forming molds, with intricate surfaces, e.g., deep holes and vias, preserving fine details. Electroless (autocatalytic) coating processes are generally known, and an example is as disclosed in U.S. Pat. No. 5,145,517 to Feldstein et al., the disclosure of which is expressly incorporated herein by reference.

The term "conformal" refers to material layers formed on a mold surface or mold processing article surface where the thickness of the material layer is substantially identical over any mold or process article surface, for example the thickness is substantially the same on vertical and horizontal surfaces. Conformal coatings of the matrix evenly cover the mold or process article surface. The evenness of the coating can be measured by, for example, examining the thickness of the coating along the walls and bottom of a hole in the mold and determining the variation in the thickness of the coating. The conformally coated mold or molding process articles may be considered conformally coated when the coating has a thickness, measured at any point normal to a feature of the mold or article is within about ±25% of the average matrix coating thickness at any other point normal to a second feature of the mold or article. In one embodiment the coating is conformal when the coating has a thickness, measured at any point normal to a feature of the mold or article is within about ±10% of the average matrix coating thickness at any other point normal to a second feature of the mold or article.

In the electroless metal coating process, the surface of the glass forming molds or other molding process equipment is in contact with or submerged in a stable electroless metallizing bath comprising a metal salt, an electroless reducing agent, a complexing agent, an electroless plating stabilizer of a non-ionic compound along with one or more of an anionic, cationic, or amphoteric compound, and a quantity of the superabrasive particulate matter, which is essentially insoluble or sparingly soluble in the metallizing bath, and optionally a particulate matter stabilizer. The superabrasive matter is maintained in suspension in the metallizing bath during the metallizing of the glass forming mold for a time sufficient to produce a metallic coating with the superabrasive materials dispersed therein.

Electroless NiP coatings containing superabrasive particles can utilize aqueous solutions containing $H_2PO_2^-$ ions, which act as the reducing agent, and nickel ions furnished by dissolved nickel salts. Similarly, the electroless NiB coatings containing superabrasive particles can utilize aqueous solutions of nickel salts and a boron-containing reducing agent, such as $BH_4^-$ ions or dimethylamine borane (DMAB). Electroless plating baths can also contain buffers, e.g., salts of weak carboxylic or dibasic acids, to prevent rapid changes in pH, plus at least one of a large variety of chemical compounds or metallic ions which act as stabilizers preventing spontaneous bath decomposition and are especially useful when forming coatings containing superabrasive particles. During the process for coating mold or other articles, the metallic ions, reducing agent and bath stabilizer can be replenished on a periodic basis as determined by wet or calorimetric chemical analyses for the respective reacting species. In an embodiment, the stabilizer concentration is high enough to prevent spontaneous decomposition of the plating bath as well as prevent nucleation of plating on the surfaces of the superabrasive particles suspended in the bath but not too high to prevent their incorporation into the coating on the article. Other plating variables may be manipulated to control the incorporation of the superabrasive particles into the metal matrix and prevent bath decomposition of the plating bath. These bath variables can include but are not limited to bath pH, temperature, reducing agent concentration.

In one example of a metallizing bath, in addition to the diamond or cBN, a wide variety of distinct matter can be added to the bath such as ceramics, glass, talcum, plastics, diamond (polycrystalline or monocrystalline types), graphite, oxides, silicides, carbonate, carbides, sulfides, phosphate, boride, silicates, oxylates, nitrides, and fluorides of various metals, as well as metal or alloys of boron, tantalum, stainless steel, chromium, molybdenum, vanadium, zirconium, titanium, and tungsten. Along with the superabrasive materials, the particulate matter may be suspended within the electroless plating bath during the deposition process and the particles may be codeposited within the metallic or alloy matrix onto the surface of the forming molds to form wear resistant coatings with good release properties. Prior to the plating process, the forming mold or molding process article to be metallized/coated with the superabrasive particles can be pre-treated including the acts of cleaning or forming a strike layer prior to the actual deposition step. In another embodiment, in addition to the actual plating (deposition), there may be an additional heat treatment step after the metallization of the surface (substrate) of the mold.

The superabrasive particles dispersed in the matrix may form the wear resistant surface on the mold base or other material contacting surface, and the surface coating can be heat treated below the melting point of the matrix material and decomposition temperature of the superabrasive to increase the hardness of the matrix. For example, for electroless nickel the hardness of the film can be improved by heating from about 100° C. to about 400° C. for about one hour. Other times and temperatures can be used for different metals. Such heat treatment below about 400° C. for nickel phosphorous provides several advantages: improved adhesion of the metal coating to the mold substrate, a better cohesion of matrix and particles, as well as the precipitation hardening of the matrix.

The coated mold or coated articles can be used in molding processes below the melting or preferably the softening point of the matrix. For example, where nickel forms the matrix for the superabrasive particles, the mold or other process parts may be used to mold glass at temperatures below about 800-900° C. (i.e, below the transition temperature Tg of the glass).

Optionally after the completion of the electroless or electroplating process to coat the superabrasive materials onto the surface of the mold, an organic size coating may be applied over the metal coating(s) and the superabrasive composites. Examples of organic size coatings include phenolic resins, epoxy resins, aminoplastic resins, urethane resins, acrylate resins isocyanurate resins, acrylated isocyanurate resins, urea-formaldehyde resins, acrylated epoxy resins, acrylated urethane resins or combinations thereof and may be dried, thermally cured or cured by exposure to radiation, for example, ultraviolet light.

A superabrasive composite coating can be applied onto a mold part or other molding process article, then the coated part may be heated to allow for an effective cure/maturation of the superabrasive composite matrix. The method for coating the part or article may include, but is not limited to, spin coating, spraying, brush coating or other coating techniques.

The coating composite including the superabrasive particles bonded to the mold base or other molding process article comprises between about 5% and about 95% by volume of superabrasive materials such as diamond, cBN, or mixtures thereof, optional abrasives such as silicon carbide, silicon nitride, aluminum oxide and the like, in a matrix of a silicon-containing precursor. The composite will be nearly inert, conduct heat, and have a very low coefficient for friction. The composite may be applied to the base surface, which is then pyrolyzed at a temperature below the thermal degradation temperature of the superabrasive particles (e.g., about 700° C. for diamond in air) to convert the precursor resin into a SiC matrix bonding the superabrasive and abrasive particles. For example, the composite comprising superabrasive particles in a thermosetting Si—C precursor such as partially allyl substituted polycarbosilanes like AHPCS or $[Si(allyl)_{0.1}H_{0.9}CH_2]_n$, or commercially available polyureasilazanes such as KiON Ceraset® is first coated onto the wear surface of the mold. The coated mold may be subsequently fired in an approximately 1100° C. inert gas furnace forming a hard/wear-resistant coating layer bonded to the mold substrate.

Optionally the coating/layer deposition may be repeated for a very thin multilayer coating, with each coating layer having a thickness of at least one abrasive particle (average thickness or diameter). Different zones or wear surfaces of the mold can be covered with a different number of coating layers.

Superabrasive composites can act as mold substrates or substrates for other molding process articles like plungers and gob knives. A high-temperature ceramic forming polymer/ceramic composite comprising superabrasive particles, such as diamond and/or cBN, and optional abrasives such as silicon carbide and mixtures these may be mixed or combined in a thermosetting ceramic precursor matrix, e.g., Si—C precursor, and used to form the structural substrate of the mold or article. The superabrasive composite can be shaped into the final structural substrate form via a resin transfer molding and pyrolysis process known in the art. Alternatively the superabrasive composite is shaped into the final structural substrate form via EDM machining or other conventional forming tools known the art until the mold meets the surface tolerance limits established for the final glass element.

Any of the superabrasive surfaces disclosed can be prepared for use in molding glass objects of optical quality by conventional grinding/polishing techniques known in the art, e.g., electro discharge machining (EDM), electro discharge grinding (EDG), laser, plasma, and water jet.

Versions of articles that can be used for molding materials in a plastic or molten state or used to handle or contact the molded materials may benefit from the low adhesion and wear resistant properties provided by the particulate superabrasive containing surfaces of the articles. The coating of the superabrasive particulate material may reduce or eliminate contamination of the molded or shaped product due to spalling or oxidation of the mold. The greater wear resistance of the superabrasive particulate surfaces provide reduced costs for manufacturing by minimizing replacement of molds and scrapping of contaminated or defective molded objects or products. The higher hardness of mold surfaces that include a particulate superabrasive allows molded articles with thinner walls and tighter dimensional tolerances to be made due reduced wear and changes in the dimensions of the mold surface.

Advantageously the surfaces of articles that have particulate superabrasive in a matrix can be used in molding processes without the need for repeatedly coating the surfaces with a traditional release agent. The surfaces that contain the particulate superabrasive in a matrix are wear resistant and can be used repeatedly providing increased utilization of molding equipment and reduced contamination of the molded objects. Because the wear resistant superabrasive surfaces can be made conformally, new molds or existing molds and especially those with fine surface features, may be coated and provide tight tolerances for molded objects made using them.

Molds produced with superabrasive surfaces are suited for the production of glasses molded at temperatures below the softening point of the matrix and can range from about 400° C. to over 1000° C., preferably from about 500° C. to about 900° C., however other ranges are possible. The superabrasive particle containing surfaces may be characterized by properties such as mechanical strength, heat resistance, exceptional wear resistance, chemical stability against the high-temperature molten glass, good release property, and/or surface precision. Molds having the superabrasive coatings are expected to have improved wear and corrosion resistance for increased time in operations, in one embodiment, of at least 25% over molds coated with materials of the prior art, although other improvement levels are possible.

Because the superabrasive compositions can be applied to structural mold parts which may be removed in operations, the mold base material (steel, carbide, ceramic) may be reused and recoated again and again with the superabrasive particulate matrix coatings as deterioration of the surface is experienced. Deterioration of the surface means that the roughness of the surface of the mold becomes non-uniform in appearance. Accordingly, the timing for recoating the mold surface may be determined as whether or not the surface roughness of the mold is uniform as observed.

EXAMPLES

The examples below are merely representative of the work that contributes to the teaching of the present invention, and the present invention is not to be restricted by the examples that follow.

In examples 1-2, a ribbon machine is used for making conventional incandescent light bulbs, two mold sets from the bulb quench mold operation. The mold sets are from a large inventory of similar molds used for producing a high-volume standard bulb.

Example 1

A composite diamond coating was applied for one set of molds. The coating comprised 8 micron diamond at a diamond volume concentration of approximately 40%, and a coating thickness of about 0.001 inches (25 micron). FIG. 1 is an optical micrograph of the inner surface of the mold used in Example 1.

Example 2

Figure 2:
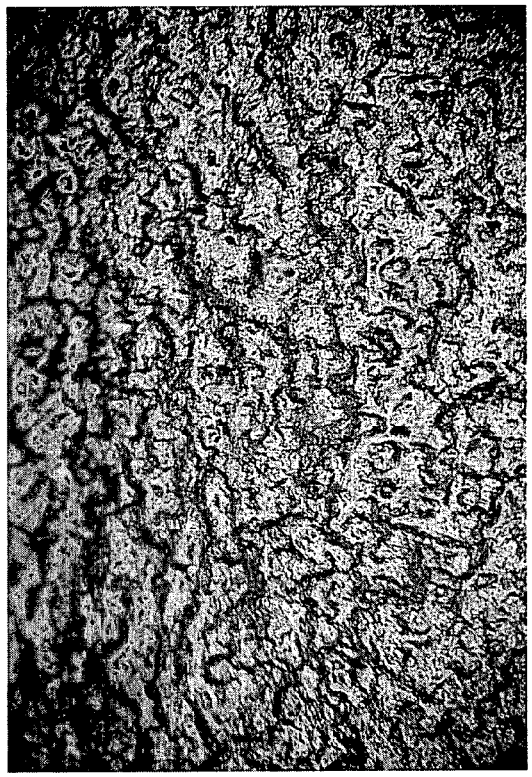
FIG. 2 is a optical micrograph of the inner surface of a mold, where the surface includes a particulate superabrasive material dispersed in a matrix that adheres to the mold base.

The inner surfaces of the molds were first laser-engraved to impart a relatively rough surface, then coated with a composite similar to that of Example 1, 8 micro diamond at a diamond volume concentration of approximately 40%, and of a coating thickness of about 0.001 inches (25 micron). FIG. 2 is an optical micrograph of the inner surface of the mold in Example 2.

In some embodiments, the molds of the present invention having a molding surface of superabrasive materials may demonstrate improved wear resistant properties, in some cases of at least 100% compared to non-coated mold parts, and at least 50% over mold parts coated with silicon carbide coatings of the prior art. The surface quality of the bulbs after 3 weeks in production were found to be still acceptable for both examples 1 and 2, in terms of dimensional tolerances as well as other visual qualities.

Example 3

This example illustrates a hypothetical mold for use in glass molding operations to form glass objects. The glass forming mold has a molding surface that includes but is not limited to a composite containing one or more of a superabrasive material selected from the group consisting of diamond, $ZrB_2$, or mixtures of these dispersed and bonded to a matrix. Optionally other particulate materials can be included with the particulate superabrasive material such as SiC, $Si_3N_4$ WC, TiC, CrC, $B_4C$, $SiO_2$, $Al_2O_3$, $ZrB_2$, and others, as well as lubricants such as but not limited to $MoS_2$, graphite, hexagonal boron nitride, polytetrafluoroethylene or combinations of these. The superabrasive composite is an adherent layer of the particulate superabrasive dispersed in the matrix that is bonded to the surface of the mold and contacts a heated molten material during a molding process. The thickness of the molding surface layer can be from 0.2 to 200 microns, and the superabrasive particles can have a size in the range of about 0.1 microns to about 2 micron. The matrix of the composite coating includes a metal plated onto the base of the mold, with the superabrasive particles homogeneously dispersed throughout the coating. The coating metal is one or more of nickel, copper, cobalt, transition metals, and alloys that include these elements. The base of the glass forming mold can be an oxidation resistant steel, steel alloy, cast iron, or nickel-chromium alloy.

To produce a glass forming mold having a wear surface having extended resistance to one or more of erosion or corrosion, a plating bath is prepared that includes but is not limited to at least one of a metal salt, an electroless reducing agent, a complexing agent, an electroless plating stabilizer in an amount sufficient to prevent decomposition of the bath and that results in the incorporation of the superabrasive particle into the plated metal film, and an insoluble or sparingly soluble superabrasive material like diamond, cubic boron nitride, or various mixtures of these. The molding surface is immersed into the bath and electroless deposition of a coating of the metal with the superabrasive particles dispersed in the metal is deposited and bonded to the surface of the mold. Optionally the coated mold can be further heat treated in a thermal annealing step to improve the hardness of the wear resistant coating.

The coated mold can be used to mold finished glass articles. A method for molding a finished glass article includes but is not limited to the steps of pressing a heat-softened glass in its working temperature range against a molding surface with sufficient force to conform the heat-softened glass to the molding surface that is coated with the particulate superabrasive composite. The shaped heat-softened glass and mold surface are cooled to a temperature below the transformation temperature of the glass; and the finished glass article is removed from the mold.

Example 4

This example demonstrates that the coating may extend the life of a glass molding component and increase productivity.

Blowhead tips are used on a ribbon machine that is a high-speed process for blow-molding glass into the shape of a bulb. The tips are pushed into a "ribbon" or thin layer molten glass having a temperature of 1100° C. that rides on an orifice plate. When the tip is fully engaged into the orifice, a circular section of molten glass is effectively cut from the ribbon and is held in place between the blowtip head and the orifice. At this point, airflow is directed from the center of the blowtip head that forces the molten glass to expand into the shape of a bulb. The temperature of the blowhead tip can reach 500° C. When the bulb achieves the proper size and shape, it is quenched and ejected from the ribbon machine. The blowhead tip is retracted and maneuvered to a new position over a fresh section of molten glass and the process is repeated.

Under normal operating conditions, the tip will cycle 5 times each minute or 7200 times per hour. Normally, the blowtips are coated with a 0.002 to 0.003 inch (50-75 µm) thick layer of hard chrome. The chrome is intended to provide wear resistance around the periphery of the blowtip where the tip contacts the orifice plate. The chrome also provides a good surface from which the molten glass releases from the tip (does not stick) and prevents oxidation from occurring on the base material. After about 90 hours of use (648,000 cycles) the periphery of the blowtip head becomes pitted and scratched due to repeated contact with the orifice and molten glass. Since these defects are transferred to the base of the glass part, care is taken to remove the tips so that the features in the glass do not become so large as to become potential fracture or stress sites. The normal routine is to shut down the entire machine and manually remove and replace each tip with a freshly chrome-plated tip. This process requires diversion of the glass melt stream and shutdown for at least two hours downtime or the equivalent of about 180,000 bulbs.

A composite diamond coating was applied to a full set (270) of Monel® blowtip heads. The coating was applied at a thickness of 0.002 inches (50 µm) using a diamond size of 8 microns and an approximate volume concentration of 35%. Examples of this coating are shown in FIGS. 4-6. The threaded center of each tip was masked with stop-off so that the coating would not adhere to this surface. The tips were installed in the normal manner and the ribbon machine was operated in the normal way. The blowhead tips with the composite diamond coating provided proper release from the molten glass, proper sealing for the airflow into the bulb and produced bulbs with no defects. Although the ribbon machine was shut down occasionally for changeout and replacement of other components, the composite diamond coated blowtip heads were kept in-place for 265 hours (1,900,000 cycles) at which time they were removed for subsequent cleaning using a light grit blast technique. The coating on the tips are still of sufficiently good quality that they will be placed back on the machine for additional hours.

When the coating eventually wears away, the composite diamond coating can be chemically stripped from the tips and each tip can be re-coated with a new layer of composite diamond coating.

Example 5

This example demonstrates that a coating can extend the life of a glass molding component and increase productivity.

Diverter chutes or deflectors are used in the glass container industry for transferring molten gobs of glass from the melt tank to the molds where the containers are formed. The chutes are normally made of steel and are designed to have a varying radius so that surface contact between the molten glass and the chute is minimized. One aspect of the gob delivery system is transfer time. The glass forming process on the mold side requires strict timing requirements, i.e., the gob is delivered to the mold within a fixed timeframe or the forming cycle will be disrupted. This could result in containers being formed having defects. One of the key characteristics of the diverter chutes that affect the timing is the temperature of the chute. Under normal and stable operating conditions, the temperature of a chute may be in the range of about 80° C. to about 115° C. In this temperature range, the glass gob will fall at the required speed and the timing of the mold process will not be disrupted. As the temperature of the chutes increases above about 115° C., the gob may begin to stick to the chute slowing its fall and increasing the temperature even more.

In order to prevent this series of events from happening, the chutes may be coated with a paint that contains graphite particles within a resin. This coating may be painted onto the inner walls of the steel chute and allowed to dry. The resulting coating, which may be, for example, about several hundred microns thick, contains a high density of graphite particles within a resin binder. The coating is thought to provide a thermal barrier between the steel and the gob (thus keeping the chute cool), but it may also provide a smoother and more lubricious surface thus minimizing the drag on the falling gob. In normal operating conditions, the coating will last in the range of about 2 weeks to about 6 months depending on the weight of the gob that is in contact with the chute, the chemical composition of the glass and the frequency of the drops or transfers. When the temperature of the chute, which is checked on a regular basis, begins to rise, this is an indication that the graphite coating may be wearing too thin or the steel surface may be exposed. At this point, the chutes are normally replaced with freshly coated parts, but this changeout requires shutting down the process for a period of time. Chutes are normally recoated by placing the used parts in an oven and burning the resin binder out of the coating after which the part is cleaned and re-coated.

An experiment was performed whereby a diverter chute was coated with composite diamond coating. Prior to applying the composite diamond coating, the chute, which had a surface roughness (Ra) value of 377 micro-inches, was polished in a series of polishing steps so as to achieve a final surface roughness (Ra) value of 35 micro-inches on the bare steel part. The polished part was subsequently coated with composite diamond coating to a thickness of 0.002 inches (50 µm) using 2 micron nominal mean size diamond with a diamond concentration of 25-30 volume percent. The coated part was heat treated at 350° C. for one hour. After heat treatment, the part was lightly grit blasted with glass beads to remove any water stains or surface oxidation resulting from rinsing and heat treatment.

The composite diamond coated diverter chute was installed in a molding machine at a glass container manufacturing facility and run for 9 weeks until the part was taken offline because of a machine changeover to a new product. During this time, the chute maintained a steady temperature and the glass gobs were delivered within the required timeframe. Inspection of the part at this point revealed that the coating was still intact indicating that the part could be used for additional processing. Also during this timeframe, the diverter chutes that contained the normal graphite/resin coating were removed from the process at the six-week interval and replaced with fresh chutes. This experiment has demonstrated that the composite diamond coating can provide at least an additional 50% life over the conventional coating.

When the coating eventually wears away, the composite diamond coating may be chemically stripped from the tips and each tip can be re-coated with a new layer of composite diamond coating.

Example 6

This example demonstrates the utility of a composite diamond coating in processing thermosetting plastics in a forming process.

Thermoplastics are widely used in forming a wide range of products from automotive components to sporting goods to consumer products. These plastics are heated to a softening stage (usually in the temperature range of about 80° C. to about 400° C., although other temperatures are possible) and then forced into a mold or through a series of dies and channels forming either the final product or an intermediary product. An example of an intermediary product is plastic pellets that are formed when two or more thermoplastics are blended together in a compounding process. In this process the individual plastic components are introduced into a compounding machine. These usually consist of one or more sets of screws assembled along a shaft that fit tightly within a barrel. The barrel is heated so as to provide the temperature necessary for softening the plastic components allowing them to flow and blend together. The plastic components are fed into the back end of the compounder and, as the screws turn, the components are mixed together and moved to the front of the machine. A die plate is positioned at the front of the machine and the softened, blended plastic is forced through the orifice holes. As the plastic discharges from the orifice holes, the material cools and hardens and is usually chopped into small pellets that are on the same length scale as their diameter. The pellets are then used as the primary plastic component in subsequent molding processes.

One act of the compounding process is to provide sufficient residence time within the mixing chamber for producing uniformly blended compounds. As the orifice holes in the die plate wear due to repeated contact with the flowing plastic, the diameter increases. As the diameter increases, the forward-pressure created by the feedscrews causes the plastic to exit at a faster rate and results in an overall lower residence time. If the orifice holes wear at a non-uniform rate, then the effect becomes more complex and the resulting size distribution of the pellets becomes broader. When the orifice holes in die plates become too large due to wear or the wear becomes too non-uniform, the plates are replaced. Die plates used in industrial plastics compounding processes wear out in timeframes ranging from 1 month to two years depending on the abrasiveness, flow rate and overall tonnage throughput of the plastics being processed. If die plates can be made to last longer and have orifices that wear more uniformly, this would allow manufacturers to produce more consistent products and keep process equipment running for longer timeframes thereby permitting a more productive process.

An experiment was performed whereby a set of steel die plates were coated with composite diamond coating. The plates were coated using about 8 micron nominal mean size diamond to a thickness of 0.002 inches (50 µm) and an approximate diamond concentration of 30-35% by volume. The bolt-holes and sides of the dies were masked using a stop-off paint. Once the plates were masked and thoroughly cleaned, the composite diamond coating was applied so that the coating was uniformly deposited within all of the orifice holes. After coating, the plates were heat treated in an oven at a temperature of about 350° C. for approximately one hour so as to increase the hardness of the metal matrix in the coating.

The composite diamond coated die plates were placed into an industrial compounding machine that was processing polyethylene terephtalate (PET) and a polyolefin and also containing a glass fiber filler. The normal amount of this type of thermoplastic that the process could produce was about 800 tons after which the holes in the die plates would become too large and non-uniform. The composite diamond coated die plate was run for about 1500 hours after which the machine was converted to another product that required a different set of dies. When the CDC coated plates were removed for inspection, it was noted that the coating appeared to be intact through the holes and that all of the orifice holes were still of the same size and shape. The plates could be used further in the same process.

It is intended that the invention not be limited to the embodiments disclosed herein, but that the invention will include all embodiments falling within the scope of the appended claims, i.e., for the superabrasives coating to be applied onto the mold surface by suitable processes known in the art including physical vapor deposition process such as plasma deposition, chemical vapor deposition process and the like, allowing the coating to be precision plated onto complex and or intricate mold shapes. All citations referred herein are expressly incorporated herein by reference.

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. An article comprising:
   a mold having a shaped surface;
   wherein one or more portions of the surface comprise a particulate superabrasive material in a matrix;
   wherein the superabrasive material comprises discrete superabrasive particles and wherein the matrix comprises a metal alloy; and
   wherein the mold surface is shaped and positioned to contact a material heated above a working point of the material during a molding process.

2. The article of claim 1 wherein the conformal surface layer contacts a metal substrate.

3. The article of claim 1 wherein the metal alloy includes nickel.

4. The article of claim 1 wherein the mold is patterned to make one or more of a design, image or character on a molded object.

5. The article of claim 1 wherein the matrix is heat treated to increase a hardness of the matrix.

6. The article of claim 1 wherein the superabrasive material is selected from the group consisting of diamond, cubic boron nitride, and mixtures thereof.

7. The article of claim 1 wherein the matrix further includes abrasive particles chosen from the group consisting of SiC, $Si_3N_4$, WC, TiC, CrC, $B_4C$, $SiO_2$, $Al_2O_3$, and $ZrB_2$.

8. The article of claim 1 wherein the matrix further includes lubricating particles chosen from the group consisting of graphite, $MoS_2$, hexagonal boron nitride, or combinations of these.

9. The article of claim 1 further comprising a strike layer between the conformal surface layer and a mold substrate.

10. The article of claim 1 wherein the metal alloy matrix comprises a nickel phosphorus alloy.

11. The article of claim 1 wherein the conformal surface layer comprises a substantially uniform thickness.

12. The article of claim 1 wherein the conformal surface layer comprises a substantially even thickness on a wall and a bottom of a hole in the mold.

13. The article of claim 1 wherein the conformal surface layer has a thickness measured at any point normal to a feature of the mold of about plus or minus 10% of an average conformal surface layer thickness at any point normal to a second feature of the mold.

14. The article of claim 1 wherein the conformal surface layer contacts an electrically non-conductive substrate.

15. The article of claim 1 wherein the conformal surface layer preserves a fine detail of the shaped surface of the mold.

16. An article comprising:
   at least one mold surface that shapes molten material in a molding process;
   wherein the mold surface is coated with an adherent conformal coating comprising discrete superabrasive particles in a metal alloy matrix so that the coating contacts the molten material.

17. The article of claim 16 wherein the surface is part of a plunger, a gob knife, a mold, a gob orifice, a mold neck ring, an extruder, blowtip, diverter chute, or extrusion die.

18. The article of claim 16 wherein the superabrasive particles comprise diamond, cubic boron nitride, a mixture of these, or a mixture containing these and other abrasive materials.

19. The article of claim 16 wherein the metal alloy matrix includes nickel.

20. The article of claim 16 further comprising a strike layer between the coating and the mold surface.

* * * * *